(12) United States Patent
Enzmann et al.

(10) Patent No.: US 8,596,179 B2
(45) Date of Patent: Dec. 3, 2013

(54) PYROTECHNIC DRIVE UNIT AND METHOD FOR THE PRODUCTION OF SUCH A UNIT

(75) Inventors: Ernst Enzmann, Grassau (DE); Silvia Michl, Wurmsham (DE); Achim Hofmann, Tuessling (DE); Rolf Ruckdeschl, Schwangau (DE); Peter Roemer, Ampfing (DE); Andreas Zehentmeier, Ampfing (DE)

(73) Assignee: TRW Airbag Systems GmbH, Aschau am Inn (DE)

( * ) Notice: Subject to any disclaimer, the term of this patent is extended or adjusted under 35 U.S.C. 154(b) by 977 days.

(21) Appl. No.: 12/079,114

(22) Filed: Mar. 25, 2008

(65) Prior Publication Data
US 2008/0236436 A1 Oct. 2, 2008

(30) Foreign Application Priority Data
Mar. 26, 2007 (DE) .......................... 10 2007 014 403

(51) Int. Cl.
*B64D 1/04* (2006.01)
(52) U.S. Cl.
USPC ........................................ 89/1.14; 137/68.13
(58) Field of Classification Search
None
See application file for complete search history.

(56) References Cited

U.S. PATENT DOCUMENTS

| 3,302,906 | A | * | 2/1967 | Winker | ............................. 244/32 |
| 5,433,147 | A | * | 7/1995 | Brede et al. | ................ 102/202.2 |
| 5,664,803 | A | * | 9/1997 | Skanberg et al. | ............. 280/737 |
| 6,073,963 | A | * | 6/2000 | Hamilton et al. | ............. 280/741 |
| 6,662,702 | B1 | * | 12/2003 | Vidot et al. | ..................... 89/1.14 |
| 6,851,372 | B2 | * | 2/2005 | Bender et al. | .................. 102/530 |
| 2005/0115390 | A1 | * | 6/2005 | Brede et al. | ..................... 89/1.14 |

FOREIGN PATENT DOCUMENTS

| DE | 102004009444 | 12/2004 |
| DE | 102005001115 | 7/2006 |
| EP | 0731004 | 9/1996 |

* cited by examiner

*Primary Examiner* — Samir Abdosh
(74) *Attorney, Agent, or Firm* — Tarolli, Sundheim, Covell & Tummino LLP

(57) ABSTRACT

A pyrotechnic drive unit includes a cylinder tube (12) having an axial end (28), a piston (14) guided in the cylinder tube (12), a pyrotechnic igniter (16) which is adjacent to the piston (14) and constitutes the pyrotechnic drive, and a plastic part (18). The plastic part (18) is injection-molded to the igniter (16) and to the axial end (28) of the cylinder tube (12) so that it fastens the igniter (16) to the cylinder tube (12) and tightly closes the axial end (28) of the cylinder tube (12), the plastic part (18) engaging the piston (14) in an initial position of the drive unit (10).

13 Claims, 2 Drawing Sheets

PYROTECHNIC DRIVE UNIT AND METHOD FOR THE PRODUCTION OF SUCH A UNIT

TECHNICAL FIELD

The invention relates to a pyrotechnic drive unit with a cylinder tube, a piston guided in the cylinder, a pyrotechnic igniter which is adjacent to the piston and constitutes the pyrotechnic drive, and a plastic part.

BACKGROUND OF THE INVENTION

Such drive units, which take up an extremely small space, are being used increasingly nowadays in active vehicle safety systems, for example for the active positioning of headrests or for tensioning a safety belt, in order to better protect a vehicle occupant in the case of a vehicle impact.

From U.S. Pat. No. 6,073,963 an igniter unit is known which moves a projectile to destroy a membrane of a cold gas pressure container.

It is an object of the present invention to simplify the construction and the production method of pyrotechnic drive units, particularly for active vehicle safety systems, in order to minimize the manufacturing expenditure.

BRIEF SUMMARY OF THE INVENTION

This is achieved in a pyrotechnic drive unit with a cylinder tube having an axial end, a piston guided in the cylinder tube, a pyrotechnic igniter which is adjacent to the piston and constitutes the pyrotechnic drive, and a plastic part. The plastic part is injection-molded to the igniter and to the axial end of the cylinder tube so that it fastens the igniter to the cylinder tube and tightly closes the axial end of the cylinder tube, the plastic part engaging the piston in an initial position of the drive unit.

As the igniter is fastened to the cylinder tube directly by the plastic part, no further shaped plate parts or suchlike and process steps are necessary for fastening the igniter to the cylinder tube. Furthermore, additional measures for the initial fixing of the piston, for example by clamping rings, can also be dispensed with, because the plastic part engages the piston in an initial position of the drive unit. By an activation of the pyrotechnic igniter, the piston moves from a piston start position, in which the plastic part engages the piston, into a piston end position. In so doing, the cylinder tube is not destroyed, but rather also forms an intact housing of the drive unit after the igniting of the drive.

In one embodiment, the plastic part is injection-molded to the piston.

The plastic part preferably forms an adhesion connection with the piston. The piston is therefore fixed relative to the plastic part and consequently also relative to the cylinder tube with minimal effort in a piston start position, so that a free movement of the piston is prevented in the cylinder tube up to an activation of the drive unit.

In order to fix the piston still more reliably in its piston start position, alternatively or additionally the plastic part can form at least one of a form-fitting and a friction-fitting connection with the piston. This can be simply achieved by a suitable profiling of the contact surface between the piston and the plastic part.

In a further embodiment, the axial end of the cylinder tube is encased by injection-molding by the plastic part. As a result of the cylinder tube end being completely encased by injection-molding, connections can be simply made between the cylinder tube and the plastic part which have an extremely high load-carrying capacity in the axial direction.

In this embodiment, the axial end of the cylinder tube, which is encased by injection-molding, and the plastic part are preferably connected with each other in a form-fitting manner in an axial direction. Greater axial forces between the cylinder tube and the plastic part are also able to be transferred without difficulty through such a form-fitting connection.

It is particularly preferable for the axial end of the cylinder tube, which is encased by injection-molding, to be laterally angled, forming an angled section, the angled section being embedded into the plastic part. Therefore, with little effort during the forming of the cylinder tube, a reliable form-fitting connection in the axial direction in the subsequent injection-molding of the plastic part can therefore already be provided for.

In a further embodiment, in a piston end position of the displaced piston the plastic part extends outside the cylinder tube up to at least close to a piston bottom. This contributes to a greater stability of the drive unit in the radial direction after the drive unit has been activated.

In a further embodiment, a piston bottom has a recess which is adjacent to the igniter in the initial position of the drive unit. Here, the piston and the igniter preferably form a pressure chamber which is at least so tight that no fluid plastic matter penetrates into the pressure chamber whilst the plastic part is being injection-molded. The greater the volume of the pressure chamber in the initial position of the drive unit, the smaller the pressure peak and hence the stressing of the component during the ignition impulse.

It is particularly preferable for the recess in the piston bottom to be an annular chamber.

To axially position the igniter, the piston may have a corresponding stop for the igniter. The igniter thereby assumes a defined position relative to the piston before the injection-molding of the plastic part, and the pressure chamber which may possibly be provided has a volume which is able to be precisely predetermined.

In a further embodiment, the igniter has projecting contacts on the rear side, which are embedded into the plastic part. These contacts constitute electric ignition contacts for activating the pyrotechnic igniter and are guided outwards through the plastic part.

An igniter plug socket can preferably be formed in the plastic part in the region of these contacts on an end of the drive unit, the end being on the igniter side. The pyrotechnic igniter is thereby able to be connected very simply to a control arrangement by a plug connection.

To minimize weight, the piston may have recesses. A low weight has an advantageous effect during the accelerating and braking of the piston in a piston end position because, owing to a smaller mass, the piston exerts a smaller inertia force on a component of the drive unit which is to be braked.

The invention further comprises a method for the production of a pyrotechnic drive unit with a cylinder tube having an axial end, a piston which is guided in the cylinder tube and has a piston bottom, and a pyrotechnic igniter which constitutes the pyrotechnic drive, the igniter having an outer housing with an end wall facing the piston bottom and lying directly opposite the piston bottom, and in which this method comprises the following steps:

a) The piston is fixed relative to the cylinder tube in a piston start position;

b) the igniter is inserted in an axial end of the cylinder tube until the igniter is adjacent to the piston, the end wall having sections resting against the piston bottom and sections spaced apart from the piston bottom, and c) a base part is mounted on the cylinder tube so that it closes the axial end of the cylinder tube and fastens the pyrotechnic igniter on the cylinder tube.

In drive units which are produced in such a way, extreme component stresses can be avoided within the drive unit after the igniter is activated, because the outer housing of the igniter, particularly the end wall of the outer housing, can break open prematurely. In addition to sections resting against the piston bottom, which are advantageous for positioning the igniter relative to the piston, the end wall in fact also has sections which are spaced apart form the piston bottom. End wall segments occurring in these sections after the breaking open of the outer housing can move substantially unimpeded into a pressure chamber, so that the pressure built up in the outer housing escapes prematurely into the pressure chamber and a sudden pressure application of the pressure chamber and local stress peaks in the region of the piston bottom are prevented.

In process step c), the igniter and the axial end of the cylinder tube can be encased by injection-molding with a fluid plastic material which forms a plastic part after hardening, in which the plastic part is the base part. This mounting design is particularly economical, because the pyrotechnic drive unit is produced by a single operation of encasing by injection-molding and comprises only a few separate components.

In a particularly advantageous variant of the method, the plastic part is injection-molded to the piston in step c). This makes a simple fixing of the piston possible in its piston start position.

In a further method variant, the igniter and the piston define a pressure chamber in step b), which is so tight that during the injection-molding of the plastic part in step c) no fluid plastic material penetrates into the pressure chamber. The construction of this pressure chamber has an advantageous effect in the igniting and breaking open of the pyrotechnic igniter, and provides for a lower stressing of the component inside the drive unit.

BRIEF DESCRIPTION OF THE PREFERRED EMBODIMENTS

Figure 1:
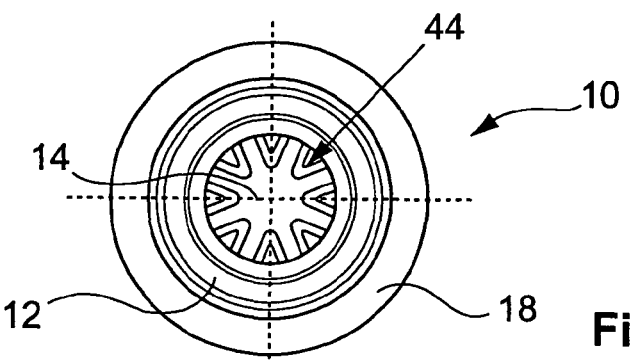
FIG. 1 shows a top view onto a pyrotechnic drive unit according to the invention.
Figure 2:
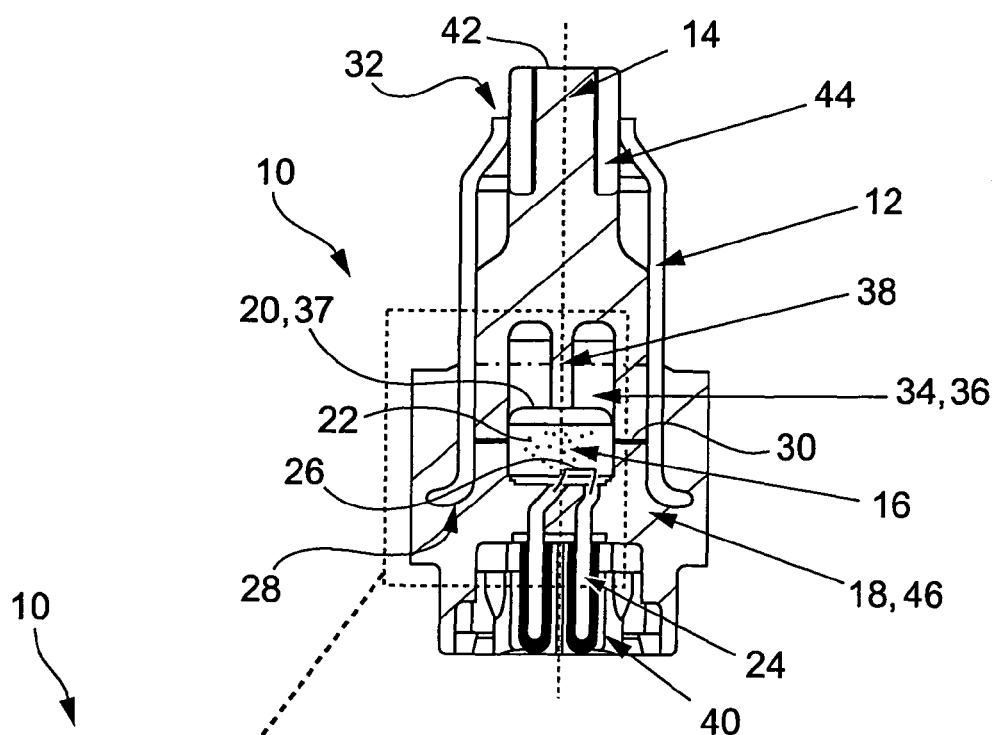
FIG. 2 shows a longitudinal section through a pyrotechnic drive unit according to the invention in accordance with a first embodiment.
Figure 3:
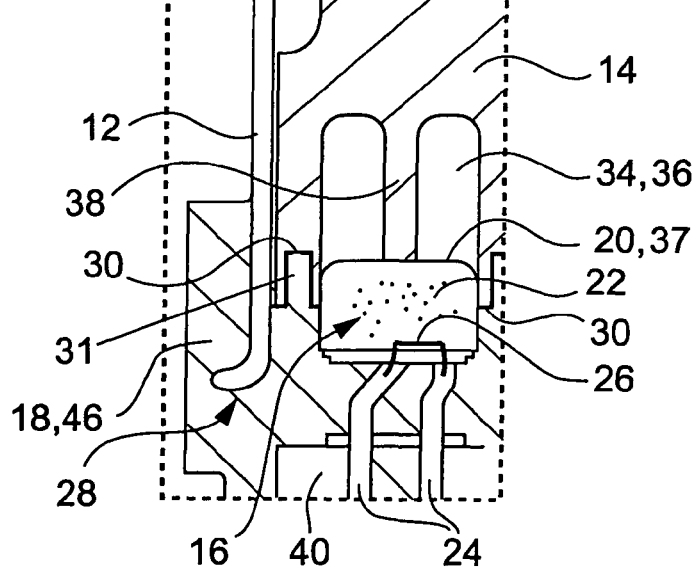
FIG. 3 shows a longitudinal section detail of a region, framed by dashed lines in FIG. 2, of a pyrotechnic drive unit according to the invention in accordance with a second embodiment.

FIGS. 1 to 3 show a pyrotechnic drive unit 10 for an active vehicle safety system, particularly for the active adjustment of headrests in the case of a vehicle impact. The drive unit 10 comprises here a cylinder tube 12, a piston 14 guided in the cylinder tube 12, a pyrotechnic igniter 16 which is adjacent to the piston 14 and constitutes the pyrotechnic drive, and a plastic part 18.

Here, a prefabricated self-contained pyrotechnic unit, consisting of an outer housing 20, pyrotechnic material 22 which is embedded into the outer housing 20, two contacts 24 which are constructed as contact pins and extend outwards through the outer housing 20, and a bridge wire 26 which connects the contacts 24 with each other is designated as an igniter 16 (also known as a squib or ignition pill). The pyrotechnic drive for the piston 14 has expressly no additional combustion chamber with a separate drive charge.

The plastic part 18 is injection-molded to the igniter 16 and an axial end 28 of the cylinder tube 12 so that on the one hand it fastens the igniter 16 on the cylinder tube 12 and on the other hand closes the axial end 28 of the cylinder tube 12 so as to be gas- and moisture-tight. Further, in an initial position of the drive unit 10 (cf. FIGS. 2 and 3), the plastic part 18 engages the piston 14, in order to hold it in a piston start position.

In a first embodiment according to FIG. 2, the plastic part 18 is injection-molded to the piston 14 and forms an adhesion connection with it. This adhesion connection occurs irrespective of the selected piston material (for example metal or plastic) by injecting or melting the injection-molded plastic part 18 onto the piston 14, in which it is ensured by the choice of material of the injection-molded plastic part 18 and of the piston 14 that the piston 14 can detach itself reliably from the plastic part 18 when the pyrotechnic drive unit 10 is activated. The connection between the piston 14 and the plastic part 18 serves merely for the initial fixing of the piston 14 in the cylinder tube 12, so that a free movement and a rattling of the piston 14 in the cylinder tube 12, which may possibly be connected therewith, is prevented. Further positioning means, such as for example clamping rings between the cylinder tube 12 and the piston 14, are no longer necessary for the initial positioning of the piston 14.

In a second embodiment of the pyrotechnic drive unit 10 according to FIG. 3, as an alternative or in addition to the adhesion connection, the piston 14 and the plastic part 18 form a form-fitting connection and/or a friction-fitting connection. For this, one or more depressions 31 are formed in the piston bottom 30 (end wall on the igniter side), which are filled with a fluid plastic material of the plastic part 18 when the plastic part 18 is injection-molded. After the plastic material has hardened, the piston bottom 30 and the plastic part 18 are interlocked in a form fit and/or friction fit, with a certain adhesion effect being generally present through the injecting-molding of the plastic part 18. In the embodiment according to FIG. 3, the connection between the piston 14 and the plastic part 18 is also constructed so that the piston 14 can detach itself reliably from the plastic part 18 when the pyrotechnic drive unit is activated.

The outer side of the axial end 28 of the cylinder tube 12 is also completely encased by injection-molding by the plastic part 18, so that the cylinder tube 12 and the plastic part 18 are connected with each other in a form-fitting manner in the axial direction. Here, the axial end 28 of the cylinder 12 which is encased by injection-molding is angled laterally towards the exterior (angled section 29) and is embedded into the plastic part 18, whereby the connection between the cylinder tube 12 and the plastic part 18 is able to be extremely stressed in the axial direction. This connection which is able to be highly stressed is advantageous, because the cylinder tube 12 brakes the piston 14 in a piston end position (not illustrated) after the pyrotechnic drive unit 10 has been activated, so that the cylinder tube 12 is stressed in the axial direction relative to the plastic part 18. In the example embodiment which is shown in accordance with FIG. 2, an axial end 32 of the cylinder tube 12, opposed to the axial end 28 on the igniter side, is tapered conically (tapered portion 33), with this tapering serving as a stop which brakes the piston 14 in its piston end position.

The plastic part 18 extends outside the cylinder tube 12, starting from the axial end 28 of the cylinder tube 12 on the igniter side, at least so far towards the axial end 32 that it is situated in a piston end position of the displaced piston 14, viewed in the axial direction, at least close to the piston bottom 30 (see dot-and-dash line in FIG. 2). It is particularly preferable for the plastic part 18 to even extend in the piston end position beyond the piston bottom 30. Through this, after the pyrotechnic drive unit 10 has been activated, i.e. under high internal pressure stress of the cylinder tube 12, a radial deformation of the cylinder tube 12 is at least prevented and the stability of the pyrotechnic drive unit 10 is ensured.

The piston bottom 30 has a recess 34 which is adjacent to the igniter 16 in the initial position of the drive unit 10 shown in FIG. 2 and runs radially only in the region of the igniter 16. In this piston start position, the piston 14 and the pyrotechnic igniter 16 therefore define a pressure chamber 36 which is at least so tight at the connection point between the piston 14 and the pyrotechnic igniter 16 that the fluid plastic material can not penetrate into the pressure chamber 36 when the plastic part is injection-molded. On the one hand, the pressure chamber 36 offers the advantage that the outer housing 20 of the igniter 16 can break open when the pyrotechnic drive unit 10 is activated, substantially without being impeded by the piston bottom 30 of the piston 14, with predetermined breaking points being provided in the outer housing 20 of the igniter 16, particularly in an end wall 37 of the outer housing 20, so that the outer housing 20 opens in a "flower" shape and the sections of the housing or the end wall which have broken open rest against a peripheral wall of the recess 34. On the other hand, the pressure chamber 36 provides for a homogeneous, increasing pressurization of the piston 14 towards the axial end 32, so that after overcoming the adhesion forces and the form-fitting and/or friction-fitting forces which may be present, the piston 14 moves from its piston start position (FIGS. 2 and 3) into its piston end position. Without the pressure chamber 36, a non-homogeneous pressure distribution with high local stress peaks in the region of the piston bottom 30 would be produced after the pyrotechnic drive unit 10 was activated. The greater the volume of the pressure chamber 36 in the initial position of the drive unit 10, the smaller the pressure peaks and therefore the stressing of the component inside the drive unit 10 during the ignition impulse.

In FIG. 2, the recess 34 in the piston bottom 30 is substantially an annular chamber, because a central pin 38 is provided in the piston 14 which extends in the axial direction almost through the entire recess 34 and serves as a spacer and stop for the pyrotechnic igniter 16. The end wall 37 facing the piston base 30 and lying immediately opposite it, or the end wall section, lying immediately opposite it, of the igniter outer housing 20 has sections 39 resting against the piston bottom 30 and sections 41 spaced apart from the piston bottom 30. Predetermined breaking points provided in the end wall 37 are preferably constructed in the region of the sections which are spaced apart from the piston bottom 30, so that the breaking open of the outer housing 20 is not impeded by the piston bottom 30 and the advantageous opening behaviour of the outer housing 20, described above, is guaranteed. In alternative embodiments, instead of the pin 38, the piston 14 may also have another stop for the axial positioning of the igniter 16. The size of the pressure chamber 36 is also precisely established by the pin 38 or an alternative stop on the piston 14, so that the movement of the piston 14 is able to be readily reproduced, over time, after the pyrotechnic drive unit 10 has been activated.

In order to activate the pyrotechnic drive unit 10, the igniter 16 has contacts 24, projecting on the rear side, which are embedded into the plastic part 18. The contacts 24 end in an igniter plug socket 40 which is formed on the end of the drive unit 10 on the igniter side in the plastic part 18. Therefore, the pyrotechnic igniter 16 can be connected very simply to a control arrangement (not shown) by means of a plug connection.

At an end 42 which is opposite to the piston bottom 30, the piston has recesses 44 which are constructed as notches in the axial direction and minimize weight. As a result of this weight reduction, the stop, constructed as a tapering of the cylinder tube 12, is less stressed when the piston 14 is braked.

The manufacturing process of the drive unit 10 according to FIGS. 1 to 4 will be briefly described below.

Figure 4:
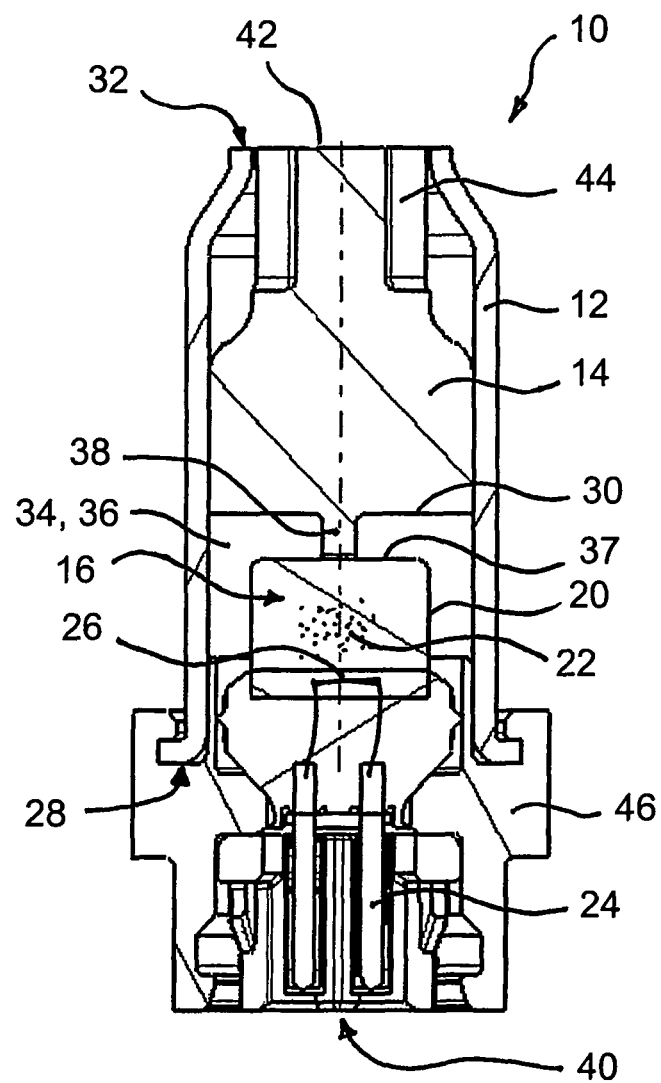
FIG. 4 shows a longitudinal section through a pyrotechnic drive unit according to the invention in accordance with a third embodiment.

In a first process step, the piston 14 and the cylinder tube 12, which is preferably constructed as a metal sleeve, are provided, the piston 14 being fixed in the cylinder tube 12 in a piston start position (FIGS. 2 to 4).

In a second process step, the igniter 16 is introduced into the axial end 28 of the cylinder tube 12, until the igniter 16 is adjacent to the piston 14. The end wall 37 of the igniter outer housing 20 has sections 39 resting against the piston bottom 30 and sections 41 spaced apart from the piston bottom 30. Preferably, the piston 14 with the spaced sections and the igniter 16 form a pressure chamber 36, which provides for a uniform stressing of the component in the cylinder tube after the pyrotechnic drive has been ignited, and prevents extreme local stress peaks.

In a third process step, a base part 46 is mounted on the cylinder tube 12 so that it tightly closes the axial end 28 of the cylinder tube 12 and fastens the pyrotechnic igniter 16 to the cylinder tube 12.

The first and second embodiments of the pyrotechnic drive unit 10 (FIGS. 2 and 3) are produced according to a preferred method variant, in which the cylinder tube 12, with the piston 14 introduced, is already placed into a first half of a tool mold for a plastic injection-molding in the first process step. In the second process step, the pyrotechnic igniter 16 is positioned with the two projecting contacts 24 in a second tool half and, by bringing the two tool halves together, the pyrotechnic igniter 16 is inserted in the axial end 28 of the cylinder tube 12 until the igniter 16 abuts on the piston 14. In this process step, the piston 14 and the igniter 16 preferably form a pressure chamber 36 into which no fluid plastic material can penetrate during the subsequent injection-molding of the plastic part 18. A particularly good positioning and seal between the pyrotechnic igniter 16 and the piston 14 is produced when the igniter 16 is partially inserted in the recess 34 of the piston bottom 30 in this process step, and forms a slight pressure fit with a peripheral wall of the recess 34. Finally, in the third process step, fluid plastic material is filled into the tool molds. In so doing, the igniter 16 and the axial end 28 of the cylinder tube 12 are encased by injection-molding with the fluid plastic material which, after hardening, forms the plastic part 18, which in this variant method corresponds to the base part 46.

In the third process step, the plastic part 18 is preferably also injection-molded to the piston 14, so that it enters into an adhesion connection with the piston. In addition to the adhesion connection, a form-fitting and/or friction-fitting connection can also be formed by a profiling of the piston bottom 30 for example by burls or recesses in the injection-molded region of the piston 14.

In some variant embodiments, the plastic part 18 also has, in particular, material components which do not consist of plastic, for example glass- or carbon fibers to reinforce the plastic part 18.

A third embodiment of the drive unit 10 according to FIG. 4 differs from the first and second embodiments according to FIGS. 2 and 3 merely in that the base part 46 is not produced from plastic, but rather from another material, for example metal. In this case, the prefabricated base part 46 is mounted on the cylinder tube 12 in the third process step by suitable fastening methods such as, for example, welding or crimping. In addition, in this embodiment the pressure chamber 36 is not only provided in the region of the end wall 37, but extends laterally up to the cylinder tube 12. The base part 46 is spaced apart from the piston 14.

The invention claimed is:

1. A pyrotechnic drive unit with
a cylinder tube (12) having an axial end (28),
a piston (14) guided in said cylinder tube (12),
a pyrotechnic igniter (16) which is adjacent to said piston (14) and constitutes said pyrotechnic drive, and
a plastic part (18),
wherein said plastic part (18) is injection-molded to said igniter (16) and to said axial end (28) of said cylinder tube (12) so that it fastens said igniter (16) to said cylinder tube (12) and tightly closes said axial end (28) of said cylinder tube (12), said plastic part (18) engaging said piston (14) in an initial position of said drive unit (10), wherein said plastic part (18) forms an adhesion connection with said piston (14).

2. The drive unit according to claim 1, wherein said plastic part (18) is injection-molded to said piston (14).

3. A pyrotechnic drive unit with
a cylinder tube (12) having an axial end (28),
a piston (14) guided in said cylinder tube (12),
a pyrotechnic igniter (16) which is adjacent to said piston (14) and constitutes said pyrotechnic drive, and
a plastic part (18),
wherein said plastic part (18) is injection-molded to said igniter (16) and to said axial end (28) of said cylinder tube (12) so that it fastens said igniter (16) to said cylinder tube (12) and tightly closes said axial end (28) of said cylinder tube (12), said plastic part (18) engaging said piston (14) in an initial position of said drive unit (10), wherein said plastic part (18) forms at least one of a form-fitting connection and a friction-fitting connection with said piston (14).

4. A pyrotechnic drive unit with
a cylinder tube (12) having an axial end (28),
a piston (14) guided in said cylinder tube (12),
a pyrotechnic igniter (16) which is adjacent to said piston (14) and constitutes said pyrotechnic drive, and
a plastic part (18),
wherein said plastic part (18) is injection-molded to said igniter (16) and to said axial end (28) of said cylinder tube (12) so that it fastens said igniter (16) to said cylinder tube (12) and tightly closes said axial end (28) of said cylinder tube (12), said plastic part (18) engaging said piston (14) in an initial position of said drive unit (10), wherein said axial end (28) of said cylinder tube (12) is encased by injection-molding of said plastic part (18).

5. The drive unit according to claim 4, wherein said axial end (28) of said cylinder tube (12) which is encased by injection-molding and said plastic part (18) are connected with each other in a form-fitting manner in an axial direction.

6. The drive unit according to claim 4, wherein said axial end (28) of said cylinder tube (12) which is encased by injection-molding is laterally angled and forms an angled section (29), said angled section (29) being embedded into said plastic part (18).

7. A pyrotechnic drive unit with
a cylinder tube (12) having an axial end (28),
a piston (14) guided in said cylinder tube (12),
a pyrotechnic igniter (16) which is adjacent to said piston (14) and constitutes said pyrotechnic drive, and
a plastic part (18),
wherein said plastic part (18) is injection-molded to said igniter (16) and to said axial end (28) of said cylinder tube (12) so that it fastens said igniter (16) to said cylinder tube (12) and tightly closes said axial end (28) of said cylinder tube (12), said plastic part (18) engaging said piston (14) in an initial position of said drive unit (10), wherein a piston bottom (30) is provided, said injection-molded plastic part (18) extending outside said cylinder tube (12) up to at least said piston bottom (30) when said piston (14) is at a displaced end position.

8. The drive unit according to claim 1, wherein a piston bottom (30) is provided, the piston bottom (30) having a recess (34) which is adjacent to said igniter (16) in said initial position of said drive unit (10).

9. The drive unit according to claim 8, wherein said recess (34) is an annular chamber.

10. A pyrotechnic drive unit with
a cylinder tube (12) having an axial end (28),
a piston (14) guided in said cylinder tube (12),
a pyrotechnic igniter (16) which is adjacent to said piston (14) and constitutes said pyrotechnic drive, and
a plastic part (18),
wherein said plastic part (18) is injection-molded to said igniter (16) and to said axial end (28) of said cylinder tube (12) so that it fastens said igniter (16) to said cylinder tube (12) and tightly closes said axial end (28) of said cylinder tube (12), said plastic part (18) engaging said piston (14) in an initial position of said drive unit (10), wherein a stop (33; 34) is provided, said piston (14) having said stop (33; 34) for axial positioning of said igniter (16).

11. A pyrotechnic drive unit with
a cylinder tube (12) having an axial end (28),
a piston (14) guided in said cylinder tube (12),
a pyrotechnic igniter (16) which is adjacent to said piston (14) and constitutes said pyrotechnic drive, and
a plastic part (18),
wherein said plastic part (18) is injection-molded to said igniter (16) and to said axial end (28) of said cylinder tube (12) so that it fastens said igniter (16) to said cylinder tube (12) and tightly closes said axial end (28) of said cylinder tube (12), said plastic part (18) engaging said piston (14) in an initial position of said drive unit (10), wherein contacts (24) are provided, said igniter (16) having contacts (24) projecting on said rear side, which are embedded into said plastic part (18).

12. The drive unit according to claim 1, wherein an igniter plug socket (40) is formed on an end of said drive unit (10) in said plastic part (18), said end being on said igniter side.

13. The drive unit according to claim 1, wherein said piston (14) has recesses (44) for minimizing weight.

* * * * *